(12) United States Patent
Polozoff

(10) Patent No.: US 7,634,755 B2
(45) Date of Patent: Dec. 15, 2009

(54) APPLICATION SPLITTING FOR NETWORK EDGE COMPUTING

(75) Inventor: Alexandre Polozoff, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 10/889,777

(22) Filed: Jul. 13, 2004

(65) Prior Publication Data

US 2006/0015849 A1 Jan. 19, 2006

(51) Int. Cl.
*G06F 9/44* (2006.01)
(52) U.S. Cl. .................. 717/106; 717/107; 709/226
(58) Field of Classification Search .............. 709/226; 717/106
See application file for complete search history.

(56) References Cited

U.S. PATENT DOCUMENTS

| 6,011,918 | A | * | 1/2000 | Cohen et al. | 717/106 |
|---|---|---|---|---|---|
| 6,813,637 | B2 | * | 11/2004 | Cable | 709/226 |
| 6,910,052 | B2 | * | 6/2005 | Gates et al. | 707/201 |
| 6,950,850 | B1 | * | 9/2005 | Leff et al. | 709/203 |
| 6,983,463 | B1 | * | 1/2006 | Hunt, Galen C. | 719/316 |
| 7,103,879 | B2 | * | 9/2006 | Ruellan et al. | 717/130 |
| 2002/0010798 | A1 | | 1/2002 | Ben-Shaul et al. | |
| 2002/0165993 | A1 | * | 11/2002 | Kramer | 709/315 |
| 2003/0135591 | A1 | * | 7/2003 | Chetuparambil et al. | 709/220 |
| 2003/0154239 | A1 | | 8/2003 | Davis et al. | |
| 2003/0212990 | A1 | | 11/2003 | Brodkorb et al. | |
| 2004/0216096 | A1 | * | 10/2004 | Messer et al. | 717/154 |

FOREIGN PATENT DOCUMENTS

| WO | WO 95/04968 | 2/1995 |
|---|---|---|
| WO | WO 2004/010292 A1 | 1/2004 |

OTHER PUBLICATIONS

Anthony Lai et al., "J2EE Connector Architecture", Mar. 24, 2004, O'Reilly on Java.com, retrieved from: http://www.onjava.com/lpt/a/4645.*

Davis et al. "EdgeComputing: Extending Enterprise Applications to the Edge of the Internet", May 2004, Proceedings of the 13th international World Wide Web conference on Alternate track papers & posters, pp. 180-187.*

Yuan et al.; Evaluation of Edge Caching/Offloading for Dynamic Content Delivery; May 20-24, 2003; pp. 461-471; ACM 1-58113-680-03/03/0005; Budapest, Hungary.

Liebmann et al.; Adaptive Data Dissemination and Caching for Edge Service Architectures built with the J2EE; SAC '04; Mar. 14-17, 2004; pp. 1717-1724; ACM 1-58113-812-1/03/04; Nic.

King; Beyond Proprietary Computing; Special Advertising Section; pp. S1- S12; 2002 CMP Media LLC, Custom Media Solutions; USA.

(Continued)

*Primary Examiner*—Lewis A. Bullock, Jr.
*Assistant Examiner*—Jue S Wang
(74) *Attorney, Agent, or Firm*—John R. Biggers; Jill Poimboeuf; Biggers & Ohanian, LLP.

(57) ABSTRACT

Application splitting for network edge computing including identifying an application split point; identifying a split type for the application split point; splitting the application into subcomponents in accordance with the split type; and moving a subcomponent to an edge network. Identifying an application split point may include identifying a class of the application that calls an EJB. Identifying an application split point may include identifying a class of the application that updates an enterprise database. Identifying an application split point may include identifying a class of the application that calls a JCA function. Identifying a split type for the application split point may include identifying a silo split type for the application split point. Identifying a split type for the application split point may include identifying an EJB split type for the application split point.

22 Claims, 11 Drawing Sheets

OTHER PUBLICATIONS

Grundy, et al.; Automatic Validation of Deployed J2EE Components Using Aspects; 2002 IEEE International Conference on Automated Software Engineering (ASE'02); USA.

Hye; Design and Inplementation of Enterprise Beans Generator/Deployer Supporting EJB for Server-Side Application Development; INSPEC: AN-7259353; Oct. 2001; pp. 429-439; KR.

Tatsubori M et al., "A bytecode translator for distributed execution of "legacy" Java Software", ECOOP 2001—Object-Oriented Programming, 15tg European Conf., (Lecture notes in Computer Science vol. 2072), pp. 236-255.

Tilevich E et al., "Aspectizing server-side distribution", Proceedings of the 18th IEEE International Conference on Automated Software Engineering, Oct. 6-10. pp. 130-141.

Po-Hao Chang et al., "An adaptive programming framework for web applications", Applications and the Internet, 2004. Proceedings of the 2004 International Symposium on Tokyo, Japan, Jan. 26-30.

Gamma E et al., "Design Patterns: Elements of Reusable Object-Oriented Software", Sep. 1999, pp. 81-136.

* cited by examiner

APPLICATION SPLITTING FOR NETWORK EDGE COMPUTING

BACKGROUND OF THE INVENTION

1. Field of the Invention

The field of the invention is data processing, or, more specifically, methods, systems, and products for application splitting for network edge computing.

2. Description of Related Art

The Internet and the World Wide Web operate primarily in a client-server model for data communications. The content being transferred is increasingly complex, and clients are increasingly diverse. It is becoming more and more difficult to efficiently deliver complex, varied content to increasingly diverse client devices. The increased demand results in more and more new devices, new servers, new clients to handle each new type of data.

In the conceptual client-server model, the client requests information from the server, and the server sends information back in the format requested by the client. This content delivery system was once considered ideal since one need only concentrate on processing at the "ends." However, reality has demanded more, and in response new services have emerged. Caches near the client and on edge-delivery points make operations faster and lighten the network load. Gateways (such as those for wireless devices) help diverse groups of clients connect. Content Delivery Networks (CDNs) better organize the vast array of Internet content for the client. All these services have grown independently of one another, however, making extensions and new services vendor-specific and hard to manage. With the evolution of diverse client devices, content providers are forced to offer data in every necessary format for every device, personal data assistants (PDAs), personal computers (PCs), cell phones, laptop computers, e-book readers, and others. Servers are forced to handle differences between the formats available and the formats the client can accept.

The network edge architecture provides a means to address the complexities that have grown for "in the network" services. The term "network edge" is usually used to describe a physical or network boundary of an entity in the Internet. For example, network edges could be the set of access points of an Internet Service Provider ("ISP") or the intranet of an enterprise network. "Network edge" can also mean a distinguished point of content delivery, such as the boundary of a country, a point at which it is useful to translate data into an appropriate language or format. The network edge is the point where content processing can occur in the path of content delivery.

The network edge architecture is a collection of technologies for performing part of the content delivery processes for transferring data between clients and servers. Its architecture is a unified approach to developing software and hardware for performing content delivery functions. Network edge architecture allows for operations such as data transcoding. Content providers can offer data in a single, standard format regardless of the type of client device, and network edge architecture makes it easier to provide a format for the presentation suited to the device. For example, a content provider may store content in a single format, regardless of the type of client device that may request the content, and the network edge technology may reformat the content for the receiving device. A rule-based service running on an edge server or an edge network makes the appropriate data transformations based on standardized protocols for various devices.

Consider an example of a movie delivery. With network edge technology, consumers see the movie in the format appropriate to their devices and their personal tastes. The content provider no longer has to worry about the device on which the movie will be viewed, because the burden of data transformation is removed from content providers and servers. Instead, data transformation is consolidated at the network edge.

In the traditional client/server architecture, customer information and client device interfaces must be managed on the client device or on the content server. That is, the customer is required to re-enter data, and the server is required to cope with client diversity issues, whether the client device is a cell phone, a PDA, a laptop, a personal computer, and so on.

The transfer and reformulation of content from provider to client happens in several steps. A client's request is amended, that is, personalized, in accordance with known information retained in the server with additional needed data being entered from the client. For example, the client may be using a cell phone to access the World Wide Web or an email service. This requires that the server send back only content appropriate to that cell phone interface and progress through voice menus or keyboard menus to obtain customer specifics. In the network edge architecture, an edge server amends the client's request to specify the appropriate cell phone interface. Then the edge server communicates with content servers to fill in customer data, thereby simplifying customer interaction. Then the edge server amends the request to the content servers to obtain data that is then reformulated by the edge serve to fit the client's device. The appropriate content is then downloaded to the client device in a manner suitable for the client device.

The network edge server resides between the client and the content servers and serves as an agent for both the customer and the content provider. When the client sends out a request for content, a network edge server amends the request, typically based on a set of predefined rules, according to the customer's information. The edge server then sends the amended request on to the content server, possibly with some exchange to the content server as indicated previously. The content server is relieved of the burden of amending the request or reformulating the content. Any transformation of content that is needed will happen at the network edge server using standard protocols. In this way, network edge architecture simplifies the information required from the content provider to address different formats needed for different devices.

Network edge architecture represents a growing shift from the traditional client-server model to a more efficient client-edge-server model. When content-level services are performed at the network edge, content providers can offer personalized, scalable services. With network edge architecture, the edge plays a role that is currently forced on both client and server. Application software that was installed entirely on a content server or an application server in the traditional client-server architecture now may be deployed to the an edge network. In addition, application software that was installed entirely on a content server or an application server in the traditional client-server architecture now may be split, and in many cases, must be split, between the content server and the edge. It would be useful to have automated tools to identify how an application should be prepared for deployment to the edge and how to split the application if necessary.

SUMMARY OF THE INVENTION

Methods, systems, and computer program products are provided for application splitting for network edge computing. Embodiments include identifying an application split point; identifying a split type for the application split point; splitting the application into subcomponents in accordance with the split type; and moving a subcomponent to an edge network. Many embodiments include determining that the application considered with the data it administers is too large to fit on the edge network.

In typical embodiments, splitting the application includes splitting the application in dependence upon a user preferences. In many embodiments, identifying an application split point includes identifying a class of the application that calls an EJB. In many embodiments, identifying an application split point includes identifying a class of the application that updates an enterprise database. In many embodiments, identifying an application split point includes identifying a class of the application that calls a JCA function.

In many embodiments, identifying a split type for the application split point includes identifying a silo split type for the application split point. In typical embodiments, identifying a split type for the application split point includes identifying an EJB split type for the application split point. In many embodiments, identifying a split type for the application split point includes identifying a façade split type for the application split point.

In some embodiments, the application split point includes a class in a calling hierarchy that calls an EJB; and the split type includes an EJB split type. In some such embodiments, splitting the application into subcomponents in accordance with the split type includes splitting the classes in the calling hierarchy into a client RMI module and a server RMI module; and moving a subcomponent to an edge network includes moving the client RMI module to the edge network.

In some embodiments, the application split point includes a class in a calling hierarchy that calls an EJB and the split type includes an EJB split type. In some such embodiments, splitting the application into subcomponents in accordance with the split type includes splitting the classes in the calling hierarchy into a client web services module and a server web services module; and moving a subcomponent to an edge network includes moving the client web services module to the edge network.

In some embodiments, the application split point includes a class in a calling hierarchy that updates an enterprise database and the split type includes a silo split type. In some such embodiments, splitting the application into subcomponents in accordance with the split type includes aggregating as one subcomponent all the classes in the calling hierarchy into a silo module; and moving a subcomponent to an edge network includes moving the silo module to the edge network.

In some embodiments, the application split point includes a class in a calling hierarchy that calls an EJB and calls an HTTP function and the split type includes a silo split type. In some such embodiments, splitting the application into subcomponents in accordance with the split type includes aggregating as one subcomponent all the classes in the calling hierarchy into a silo module; and moving a subcomponent to an edge network includes moving the silo module to the edge network.

In some embodiments, the application split point includes a class in a calling hierarchy that calls a JCA function and calls an HTTP function and the split type includes a silo split type. In some such embodiments, splitting the application into subcomponents in accordance with the split type includes aggregating as one subcomponent all the classes in the calling hierarchy into a silo module; and moving a subcomponent to an edge network includes moving the silo module to the edge network.

In some embodiments, the application split point includes a class in a calling hierarchy that is listed more than once as a potential split point and the split type includes a façade split type. In some such embodiments, splitting the application into subcomponents in accordance with the split type includes splitting the classes in the calling hierarchy into a client web services module and a server web services module; and moving a subcomponent to an edge network includes moving the client web services module to the edge network.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for application splitting for network edge computing. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Application Splitting For Network Edge Computing

Figure 1:
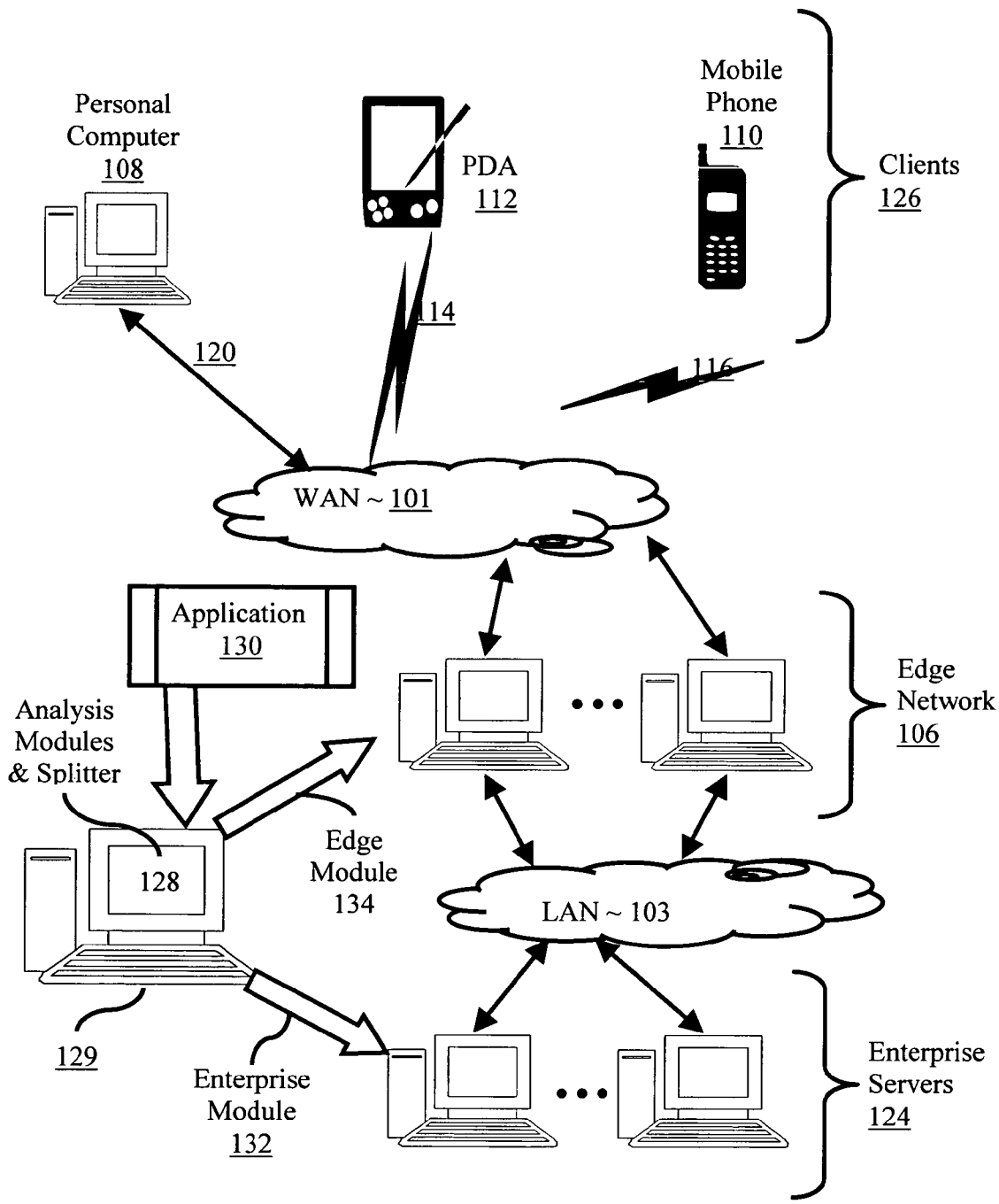
FIG. 1 sets forth a system diagram of an exemplary system for application splitting for network edge computing according to embodiments of the present invention.

Methods, systems, and products are described for application splitting for network edge computing with reference to the accompanying drawings, beginning with FIG. 1. FIG. 1 sets forth a system diagram of an exemplary system for application splitting for network edge computing according to embodiments of the present invention. The system of FIG. 1 includes several exemplary client devices (126) connected through wide area network (101) to several edge server configured as an edge network (106). The edge servers are in turn connected through local area network (103) to several application and content servers represented as enterprise servers (124).

The clients (126) in the example of FIG. 1 include a personal computer (108) connected to wide area network (101) through wireline connection (120), a wireless, network-enabled personal digital assistant ("PDA") (112) connected to wide area network (101) through wireless connection (114), and mobile telephone (110) connected to wide area network (101) through wireless connection (116).

The system of FIG. 1 includes an application program (130) that is under development on development system (129) for splitting into two modules, an edge module (134) for installation on the edge network (106) and an enterprise module (132) for installation on the enterprise network (124). Development system (129) is a computer having a software development environment such as the Java™ Software Development Kit ("SDK") and also having analysis modules and a splitter (128) that operate generally by identifying application split points, identifying split types for the application split points, splitting applications into subcomponents in accordance with the split types, and moving some subcomponents to an edge network.

Figure 2:
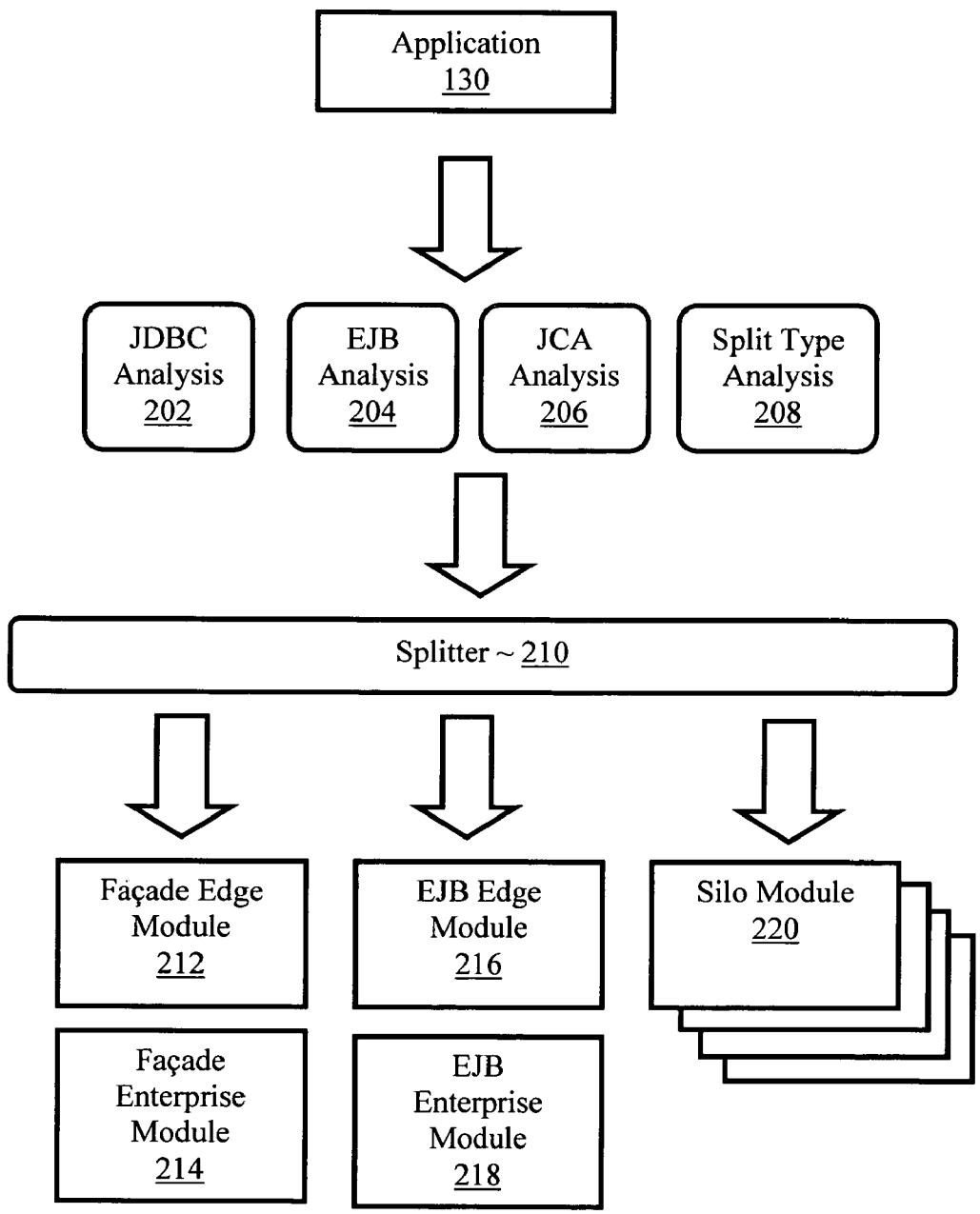
FIG. 2 sets forth a block diagram illustrating an exemplary software development system.

For further explanation, FIG. 2 sets forth a block diagram illustrating an exemplary software development system that operates generally by identifying application split points, identifying split types for the application split points, splitting applications into subcomponents in accordance with the split types, and moving some subcomponents to an edge network. The exemplary system of FIG. 2 includes a JDBC™ analysis module (202) that operates generally to identify application split points as classes that call Java DataBase Connectivity ("JDBC") functions to update enterprise databases. Such calls to JDBC functions may be represented, for example, as calls to Java member methods named 'executeUpdate' or 'executeInsert.'

The exemplary system of FIG. 2 also includes an EJB™ analysis module (204) that operates generally to identify application split points as classes that call Enterprise Java Beans ("EJBs"). Classes that call EJBs may be identified, for example, as classes that construct session EJBs using calls to the EJB Properties( ) constructor, the InitialContext( ) constructor, and so on.

The exemplary system of FIG. 2 also includes a JCA™ analysis module (206) that operates generally to identify application split points as classes that call Java Connector Architecture ("JCAs") functions. Classes that call JCAs functions may be identified, for example, as classes using calls to the JCA ConnectionFactory( ), the createInteraction( ) method, the Interaction.execute( ) method, and so on.

In the example of FIG. 2, the analytic modules (202, 204, and 206) identify split points as a list of potential split point. For each split point so identified, the split type analysis module (208) identifies a split type. The split type analysis module operates generally to identify an EJB split type for split points that are classes that call EJB functions. The split type analysis module operates to identify a Silo split type for split points that are classes that update enterprise databases through, for example JDBC calls. The split type analysis module operates to identify a Silo split type for split points that are classes that make HTTP calls. The split type analysis module operates to identify a façade split type for split points that are classes identified more than once by the analytic modules (202, 204, and 206) as potential split points.

The exemplary system of FIG. 2 includes a splitter (210), a software module that generally carries out the work of creating subcomponents of the application (130) by splitting the application at the identified split points in accordance with the split type for each split point. For EJB split type, splitter (210) may split application (130) into a client RMI™ ("Java Remote Method Invocation") module and a server RMI module, move the client RMI module to an edge network as an EJB edge module (216), and move the server RMI module to an enterprise network as an EJB enterprise module (218). Alternatively for the EJB split type, splitter (210) may split application (130) into a client web services module and a server web services module, move the client web services module to an edge network as an EJB edge module (216), and move the server web services module to an enterprise network as an EJB enterprise module (218). Similarly, for the façade split type, splitter (210) may split application (130) into a client web services module and a server web services module, move the client web services module to an edge network as a façade edge module (212), and move the server web services module to an enterprise network as a façade enterprise module (214). For the silo split type, splitter (210) may aggregate as one subcomponent all the classes in the calling hierarchy into a silo module (220). The splitter (210) may move the silo module (220) to an edge network or to an enterprise network.

Figure 3:
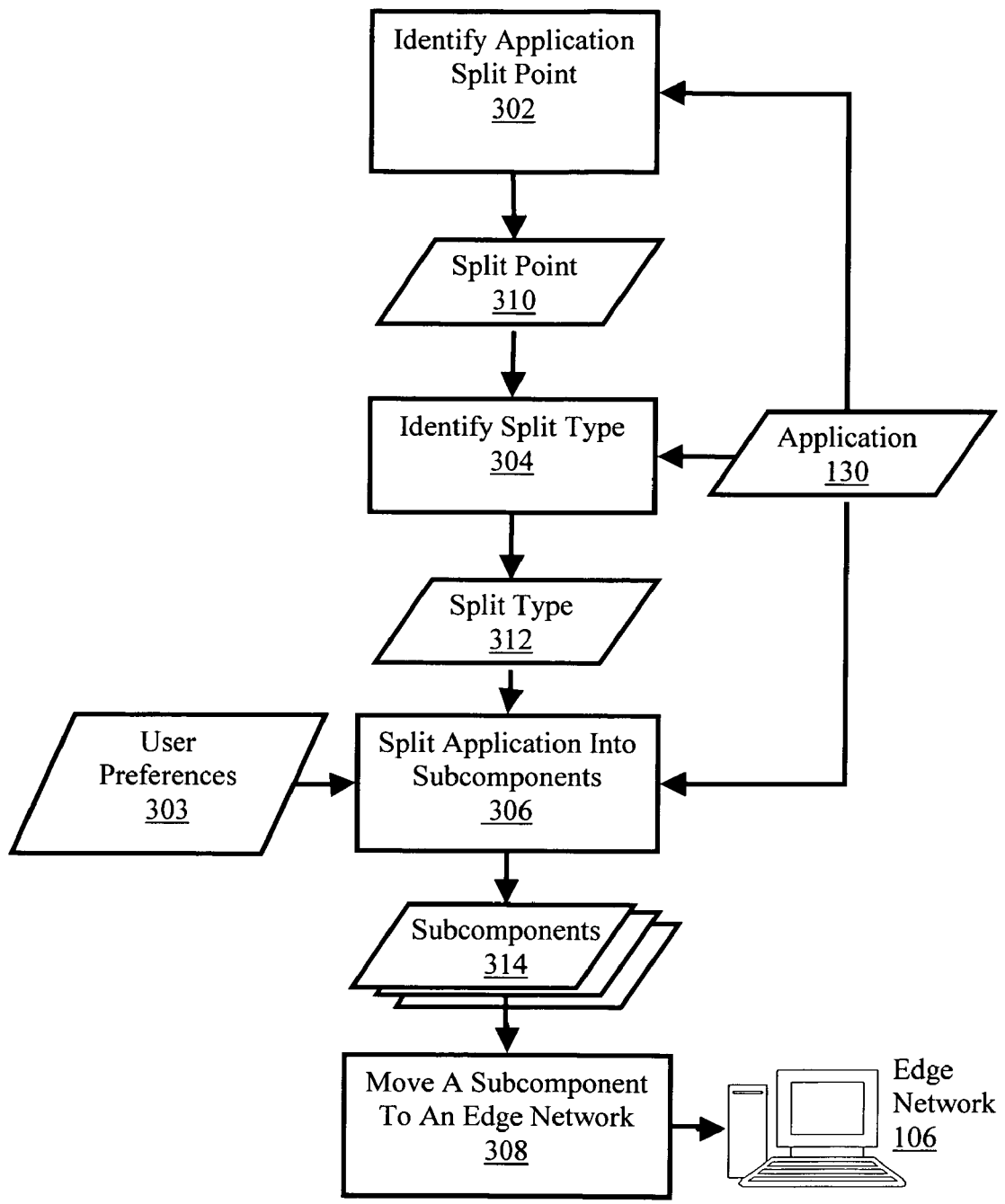
FIG. 3 sets forth a flow chart illustrating an exemplary method for application splitting for network edge computing.
Figure 4:
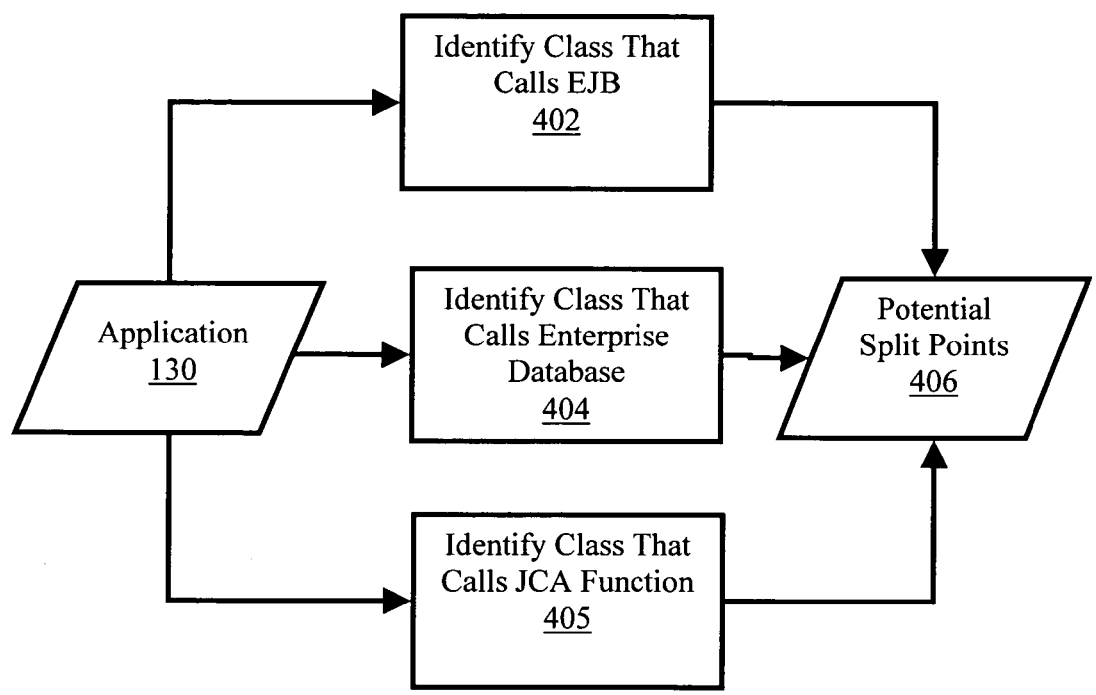
FIG. 4 sets forth a flow chart illustrating an exemplary method for identifying an application split point.

For further explanation, FIG. 3 sets forth a flow chart illustrating an exemplary method for application splitting for network edge computing that includes identifying (302) an application split point (310). FIG. 4 sets forth a flow chart illustrating an exemplary method for identifying an application split point. In the example of FIG. 4 identifying an application split point is carried out by identifying (402) a class of the application that calls an EJB. As noted above, a class that calls an EJB can be identified by its use of EJB member methods such as calls to the EJB Properties( ) constructor, the InitialContext( ) constructor, and so on. In the method of FIG. 4, identifying an application split point also can be carried out by identifying (404) a class of the application that updates an enterprise database through, for example, calls to JDBC methods such as 'executeUpdate' or 'executeInsert.' In the method of FIG. 4, identifying an application split point can be carried out by identifying (405) a class of the application that calls a JCA function. Classes that call JCA functions may be identified, for example, as classes using calls to the JCA ConnectionFactory( ), the createInteraction( ) method, the Interaction.execute( ) method, and so on.

Figure 5:
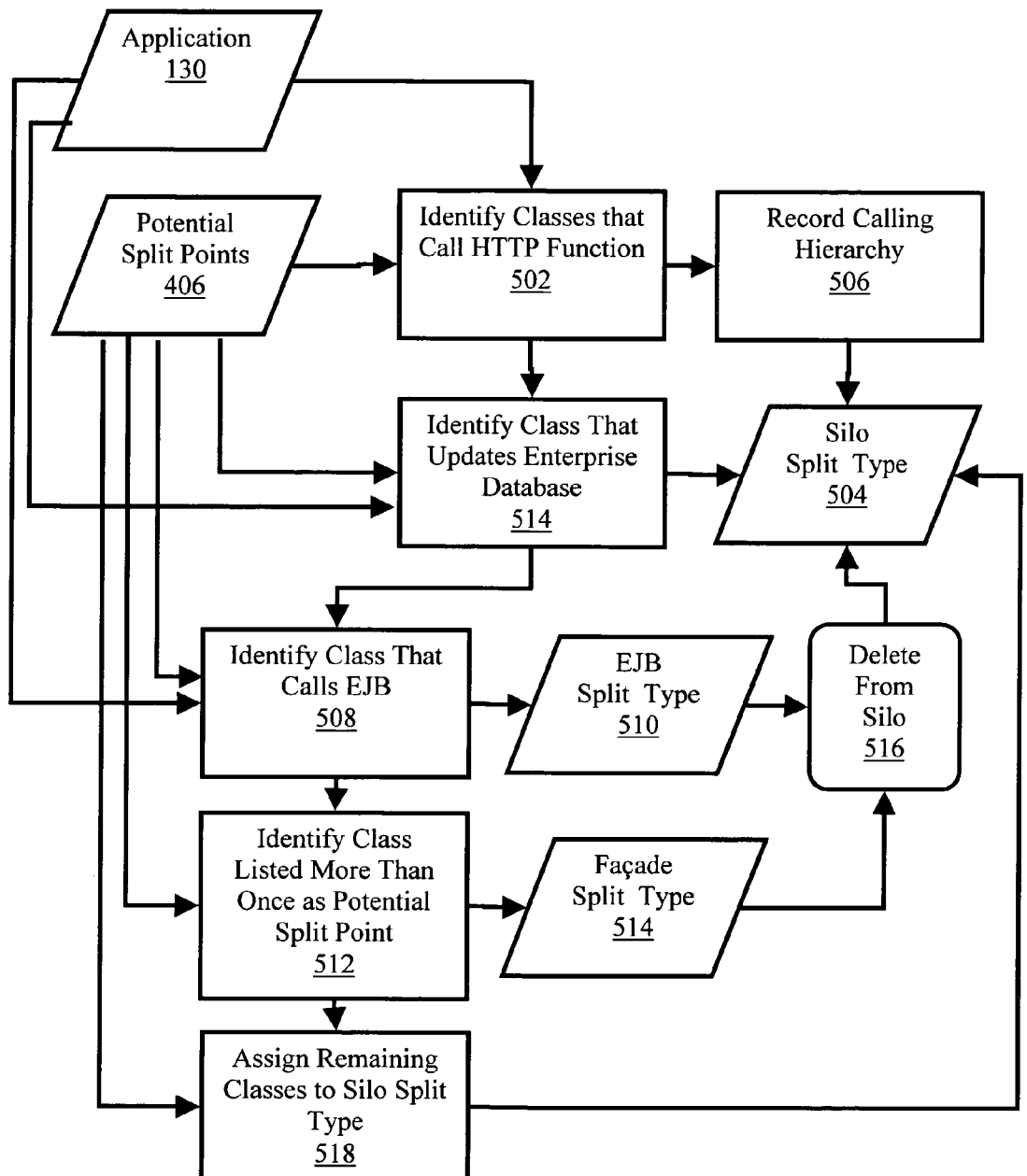
FIG. 5 sets forth a flow chart illustrating exemplary methods for identifying a split type for an application split point.

Again with reference to FIG. 3: The method of FIG. 3 also includes identifying (304) a split type (312) for the application split point. FIG. 5 sets forth a flow chart illustrating exemplary methods for identifying a split type for an application split point. In the example of FIG. 5, identifying a split type for the application split point includes identifying a silo split type (504) for the application split point. In the example of FIG. 5, identifying a silo split type (504) for the application split point can be carried out by identifying (502), from a list of potential split points (406) and the application (130), classes in the application that call an HTTP function and recording (506) the calling hierarchy of the identified class. Examples of HTTP functions include Java member methods in HTTPRequest classes, HTTPResponse classes, and HTTPSession classes.

In the example of FIG. 5, identifying a silo split type can also be carried out by identifying (514), from a list of potential split points (406) and the application (130), a class that updates an enterprise database. A class that updates an enterprise database may be identified, for example, by calls to JDBC member methods such as 'executeUpdate' and 'executeInsert.' In the method of FIG. 5, identifying a split type for the application split point includes identifying (508) an EJB split type (510) for the application split point. In the method of FIG. 5, identifying an EJB split type can be carried out by identifying (508), from a list of potential split points (406) and from the application (130) source code, a class that calls an EJB, indicated, for example, by calls to the EJB Properties( ) constructor, the InitialContext( ) constructor, and so on.

In the method of FIG. 5, identifying a split type for the application split point includes identifying a façade split type (514) for the application split point. In the method of FIG. 5, identifying a façade split type (514) for the application split point can be carried out by identifying (512), from a list of potential split points, a class that is listed more than once as a potential split point.

The method of FIG. 5 also includes assigning (518) all remaining unassigned classes on the list of potential split points to the silo split type (504). That is, in scanning through the classes listed as potential split points, a split type analysis module such as the one shown at reference (208) on FIG. 2, assigns the split type 'silo' to each split point that is not already identified as an EJB split type or a façade split type.

Some embodiments according to the present invention implement all three kinds of splits: silo splits, façade splits, and EJB splits. In such embodiments, a split point that calls HTTP functions or updates an enterprise database and also calls EJBs or is listed more than once as a potential split point may be classified as a silo split type and an EJB split type or a façade split type. That is, one split point may be assigned more than one split type. In order to avoid conflicts among the split types, such embodiments may advantageously permit only one split type per split point, implemented by deleting (516) from the silo split type (504) any split point that is also identified as an EJB split type (510) or a façade split type (514).

Again with reference to FIG. 3: The method of FIG. 3 also includes splitting (306) the application into subcomponents (314) in accordance with the split type and moving (308) a subcomponent to an edge network (106). For EJB split type, the method of FIG. 3 includes splitting the application (130) into a client RMI™ ("Java Remote Method Invocation") module and a server RMI module, and moving the client RMI module to an edge network, and moving the server RMI module to an enterprise network. Alternatively for the EJB split type, the method of FIG. 3 includes splitting the application (130) into a client web services module and a server web services module, moving the client web services module to an edge network, and moving the server web services module to an enterprise network. Similarly, for the façade split type, the method of FIG. 3 includes splitting the application (130) into a client web services module and a server web services module, moving the client web services module to an edge network, and moving the server web services module to an enterprise network. For the silo split type, the method of FIG. 3 includes aggregating as one subcomponent all the classes in the calling hierarchy into a silo module and moving the silo module to an edge network or to an enterprise network.

In the method of FIG. 3 splitting (306) the application includes splitting the application in dependence upon a user preferences (303). Examples of such user preferences include:
  no split—if entire application and its database will fit on the edge network
  identify and split by silo split types only
  identify and split by façade split types only
  identify and split by EJB split types only
  identify all split types, but split by silo only
  identify all split types, but split by façade only
  identify all split types, but split by EJB only
  identify all split types, and split by priority: silo/façade/EJB The first exemplary user preference recites "no split—if entire application and its database will fit on the edge network." In such an example if the entire application and its database will fit on the edge network, the application is not split and the entire application is moved to the edge network. The method of FIG. 3 therefore also includes determining whether the application considered with the data it administers is too large to fit on the edge network. One way of determining whether the application considered with the data it administers is too large to fit on the edge network is carried out by comparing the available data storage capacity of edge network and the data storage requirement for the application and the data in the databases administered by the application.

The user preferences listed above ("identify all split types, and split by priority: silo/façade/EJB") means that if more than one split type is present, the application is split in dependence upon priority of present split types, in this case silo split types are preferred to façade split types and façade split types are preferred to EJB split types. That is, if all split types are present, split by silo only. If only façade and EJB split types are present, split by façade only. If only EJB split types are present, split by EJB.

Splitting (306) the application into subcomponents (314) in accordance with the split type also advantageously includes a check (not shown) that each class to be included a subcomponent is serializable. Most Java classes are serializable—unless, for example, a member method takes a native data type, such as a character or integer, for example, among its call parameters. Checking that each class in a subcomponent is serializable, therefore, may be carried out by scanning the application source code of references to native data types, reporting the discover of such native data types, and converting them to Java classes and references to Java objects.

In addition, splitting (306) the application into subcomponents (314) in accordance with the split type also may advantageously include glue insertion. That is, a subcomponent to be moved to an edge network may include data to be maintained statefully across multiple request/response exchanges. Such stateful data may be maintained in a Java HTTPSession object, for example. When application functionality is split between the edge network and the enterprise network, the stateful data may usefully be maintained on both the edge server and the enterprise server. The software used to communicate the stateful data from an edge module to a corresponding enterprise module is referred to as 'glue.' In typical embodiments of the present invention, splitting (306) the application into subcomponents (314) in accordance with the split type also advantageously includes checking for the presence of classes that maintain such stateful data, such as classes containing HTTPSession objects or references to HTTPSession objects, for example, and inserting one or more glue classes and calls to glue classes to assure that the stateful data is made available as needed in both the edge module and its related enterprise modules.

Figure 6:
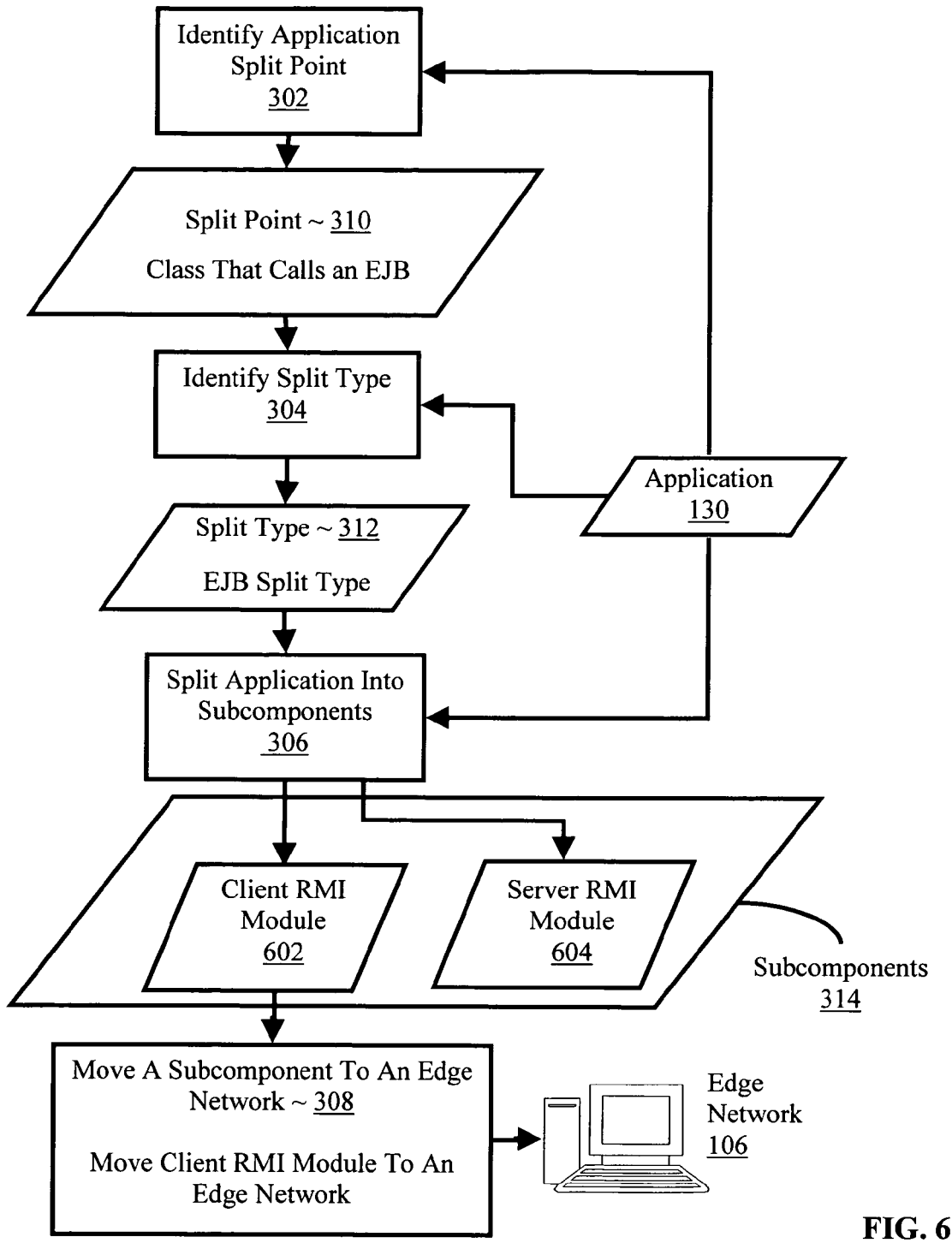
FIG. 6 sets forth a flow chart illustrating an exemplary method for application splitting for network edge computing for the EJB split type.

For further explanation, FIG. 6 sets forth a flow chart illustrating an exemplary method for application splitting for network edge computing for the EJB split type. That is, in the example of FIG. 6, the application split point (310) is identified as a class in a calling hierarchy that calls an EJB and the split type (312) is identified as an EJB split type. In the method of FIG. 6, splitting (306) the application into subcomponents (314) in accordance with the split type is carried out by splitting the classes in the calling hierarchy into a client RMI module (602) and a server RMI module (604). In the method of FIG. 6, moving (308) a subcomponent to an edge network is carried out by moving the client RMI module (602) to the edge network (106).

Figure 7:
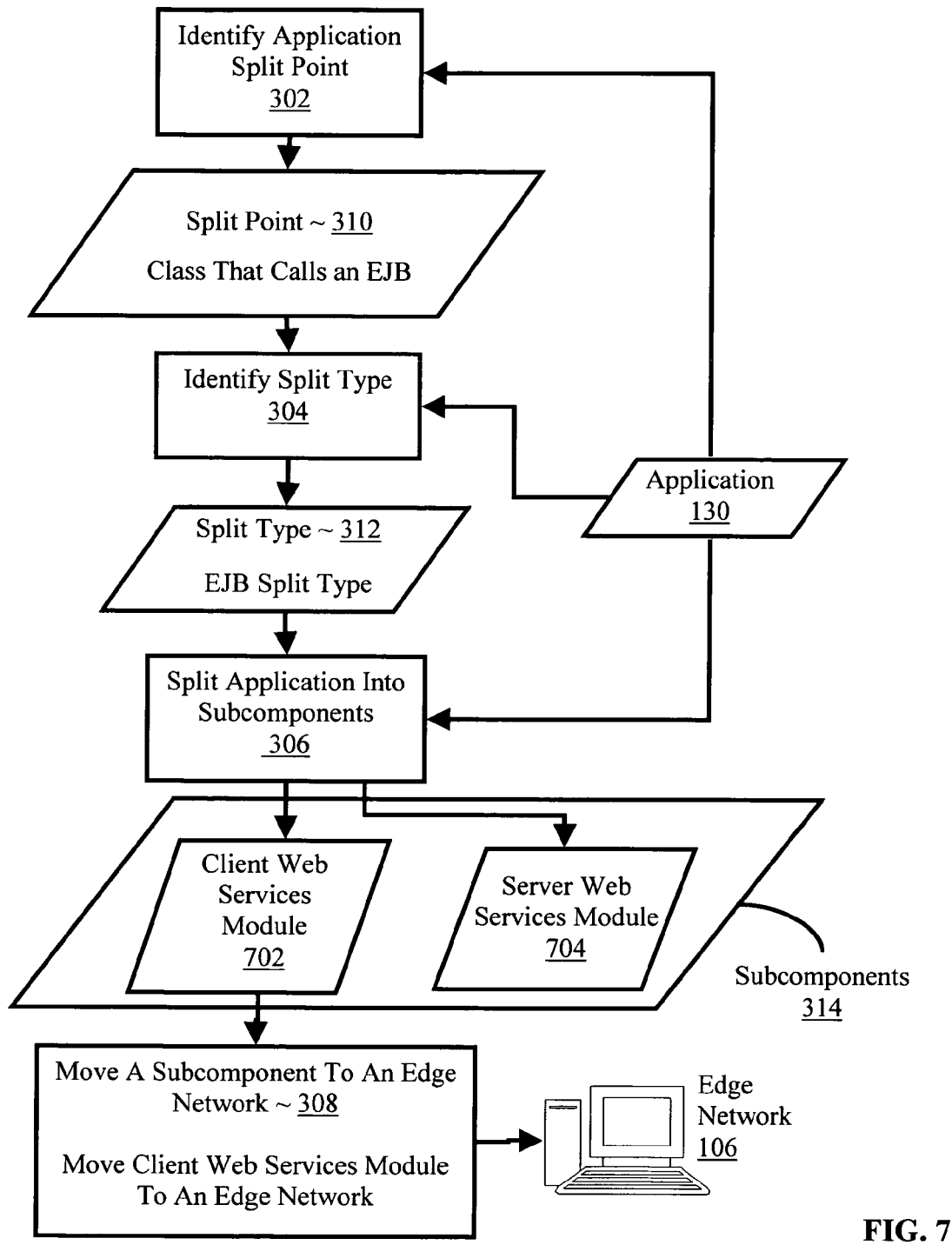
FIG. 7 sets forth a flow chart illustrating another exemplary method for application splitting for network edge computing for the EJB split type.

For further explanation, FIG. 7 sets forth a flow chart illustrating another exemplary method for application splitting for network edge computing for the EJB split type. That is, the application split point (310) is identified as a class in a calling hierarchy that calls an EJB, and the split type (312) is identified as an EJB split type. In the method of FIG. 7, splitting (306) the application (130) into subcomponents (314) in accordance with the split type (312) is carried out by splitting the classes in the calling hierarchy into a client web services module (702) and a server web services module (704). In the method of FIG. 7, moving (308) a subcomponent to an edge network (106) is carried out by moving the client web services (702) module to the edge network (106).

Figure 8:
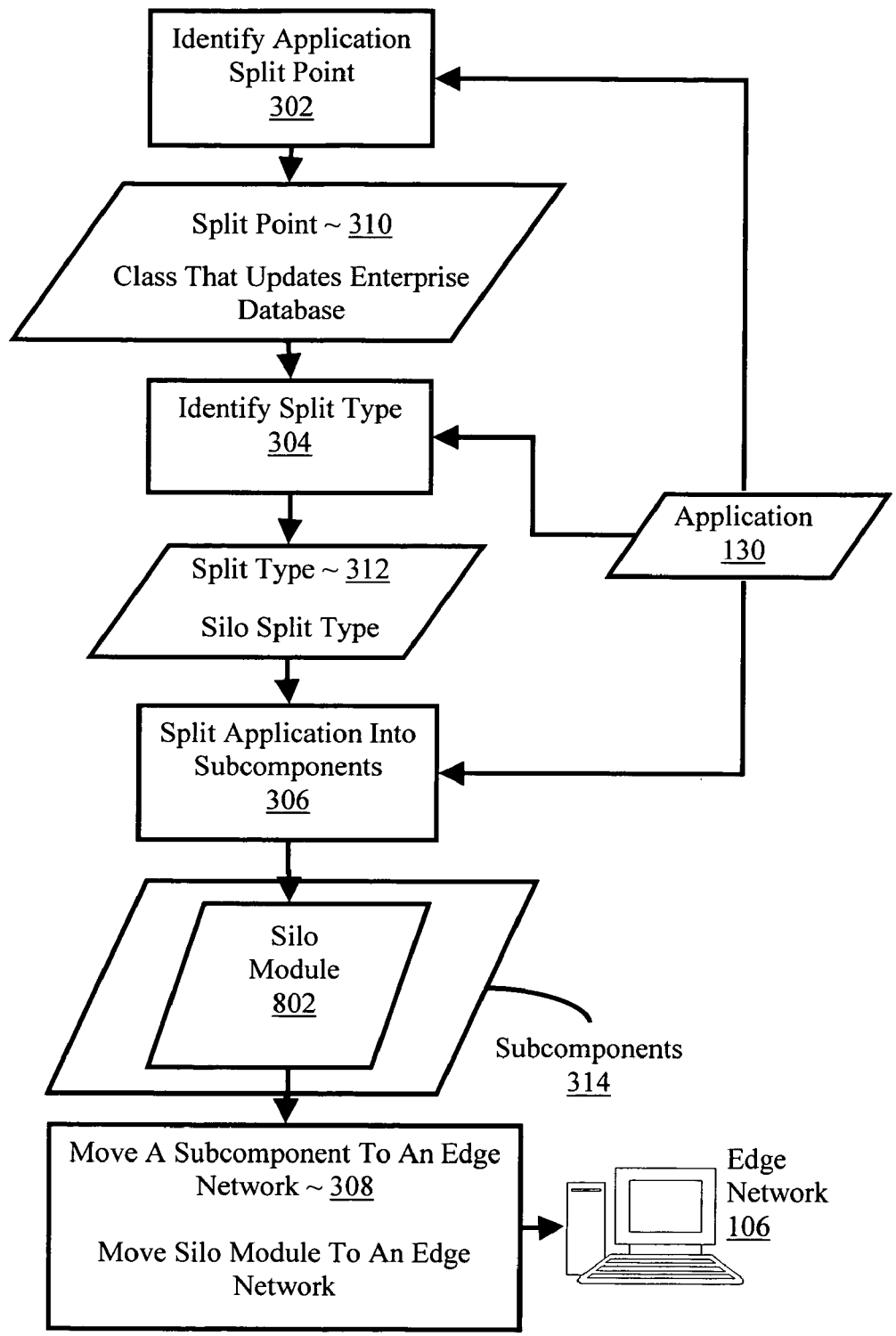
FIG. 8 sets forth a flow chart illustrating an exemplary method for application splitting for network edge for the silo split type.

For further explanation, FIG. 8 sets forth a flow chart illustrating an exemplary method for application splitting for network edge for the silo split type. In the example of FIG. 8, the application split point (310) is identified as a class in a calling hierarchy that updates an enterprise database, and the split type (312) is identified as a silo split type. In the method of FIG. 8, splitting (306) the application (130) into subcomponents (314) in accordance with the split type (312) is carried out by aggregating as one subcomponent all the classes in the calling hierarchy into a silo module (802). In the method of FIG. 8, moving (308) a subcomponent to an edge network (106) is carried out by moving the silo module (802) to the edge network (106).

Figure 9:
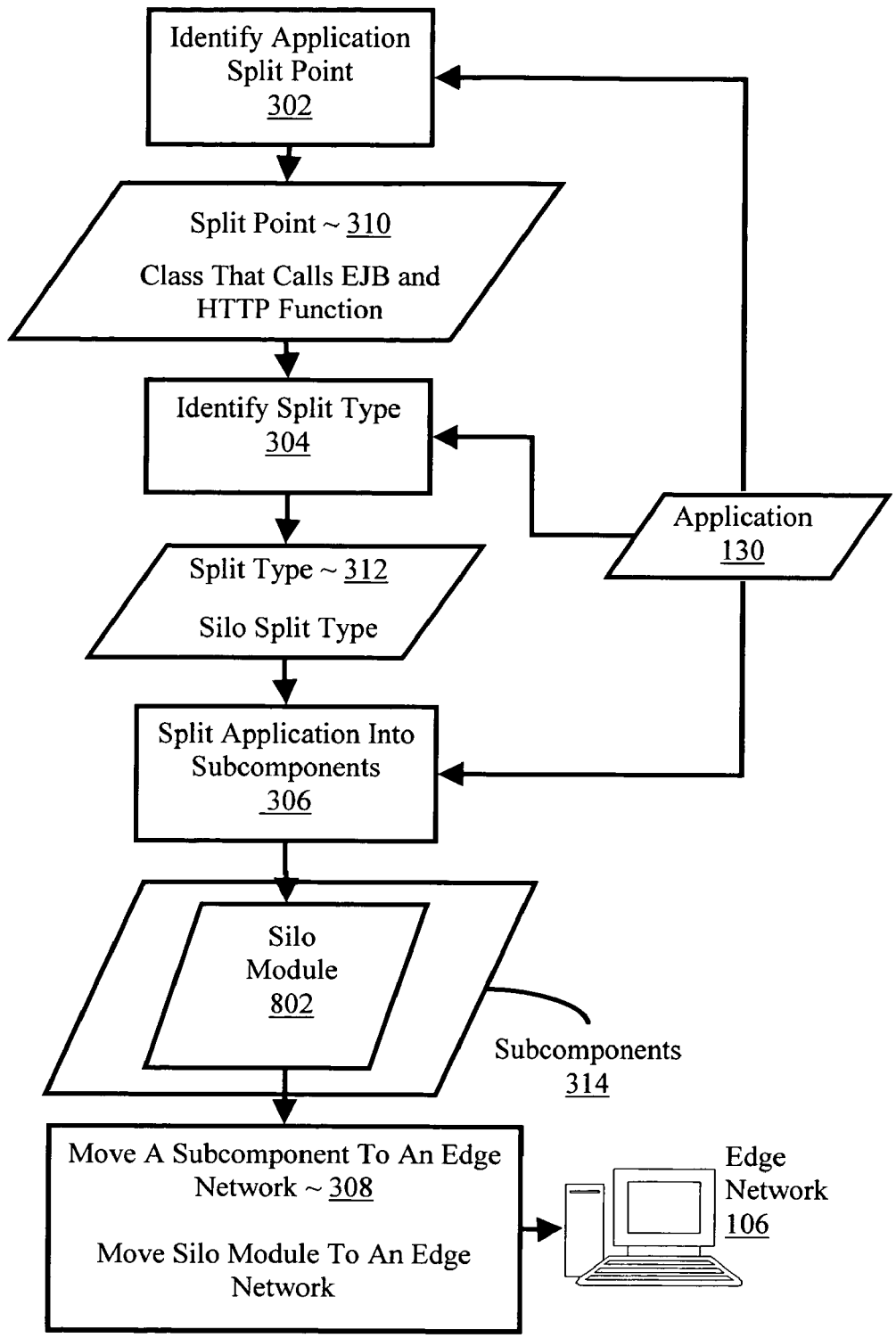
FIG. 9 sets forth a flow chart illustrating another exemplary method for application splitting for network edge computing for the silo split type.

For further explanation, FIG. 9 sets forth a flow chart illustrating another exemplary method for application splitting for network edge computing for the silo split type. In the example of FIG. 9, the application split point (310) is identified as a class in a calling hierarchy that calls an EJB and calls an HTTP function and the split type (312) is identified as a silo split type. In the method of FIG. 9, splitting (306) the application (130) into subcomponents (314) in accordance with the split type is carried out by aggregating as one subcomponent all the classes in the calling hierarchy into a silo module (802). In the method of FIG. 9, moving (308) a subcomponent to an edge network (106) is carried out by moving the silo module (802) to the edge network (106).

Figure 10:
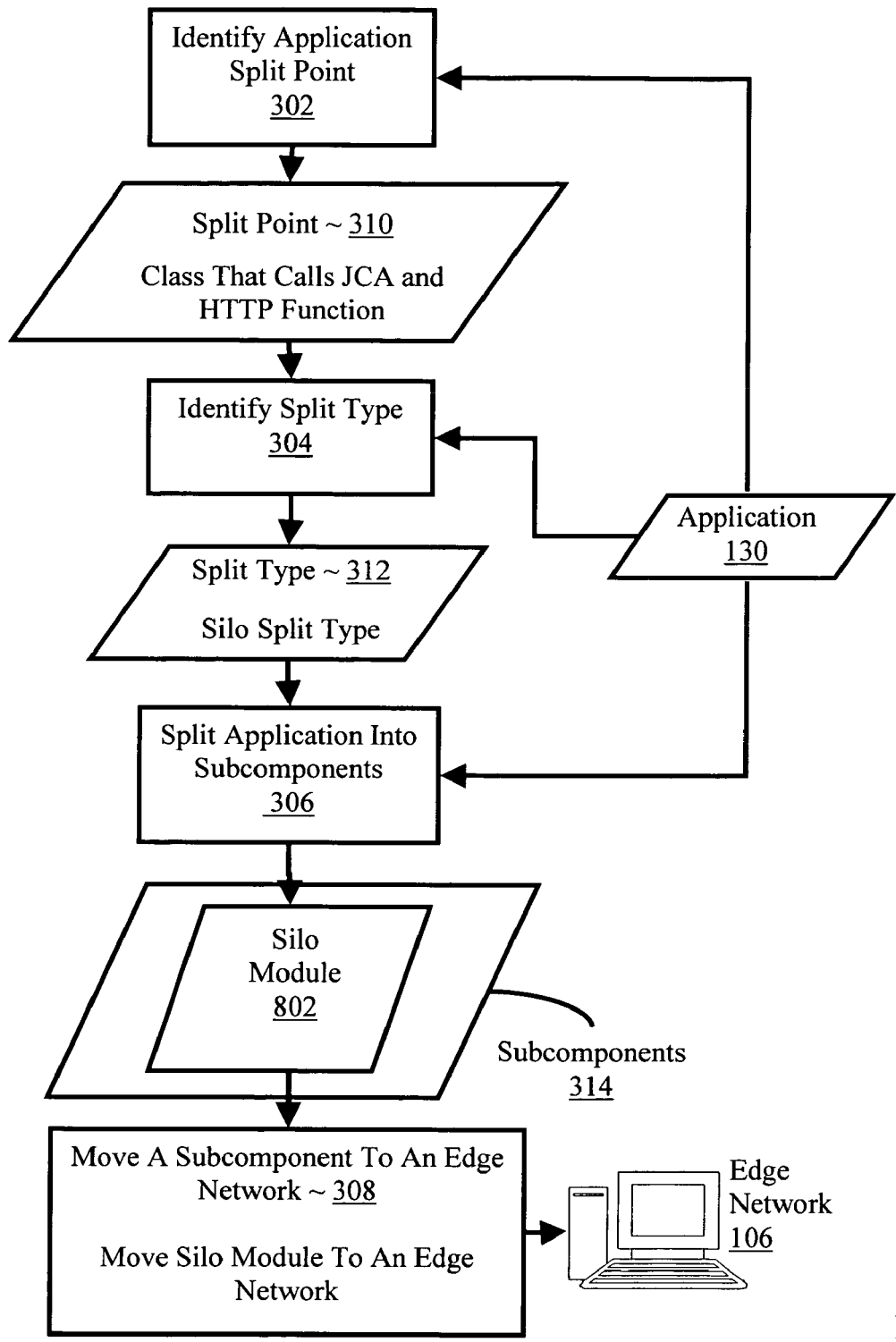
FIG. 10 sets forth a flow chart illustrating another exemplary method for application splitting for network edge computing for the silo split type.

For further explanation, FIG. 10 sets forth a flow chart illustrating another exemplary method for application splitting for network edge computing for the silo split type. In the example of FIG. 10, the application split point (310) is identified as a class in a calling hierarchy that calls a JCA function and calls an HTTP function, and the split type (312) is identified as a silo split type. In the example of FIG. 10, splitting (306) the application (130) into subcomponents (314) in accordance with the split type (312) is carried out by aggregating as one subcomponent all the classes in the calling hierarchy into a silo module (802). In the example of FIG. 10, moving (308) a subcomponent to an edge network (106) is carried out by moving the silo module (802) to the edge network (106).

Figure 11:
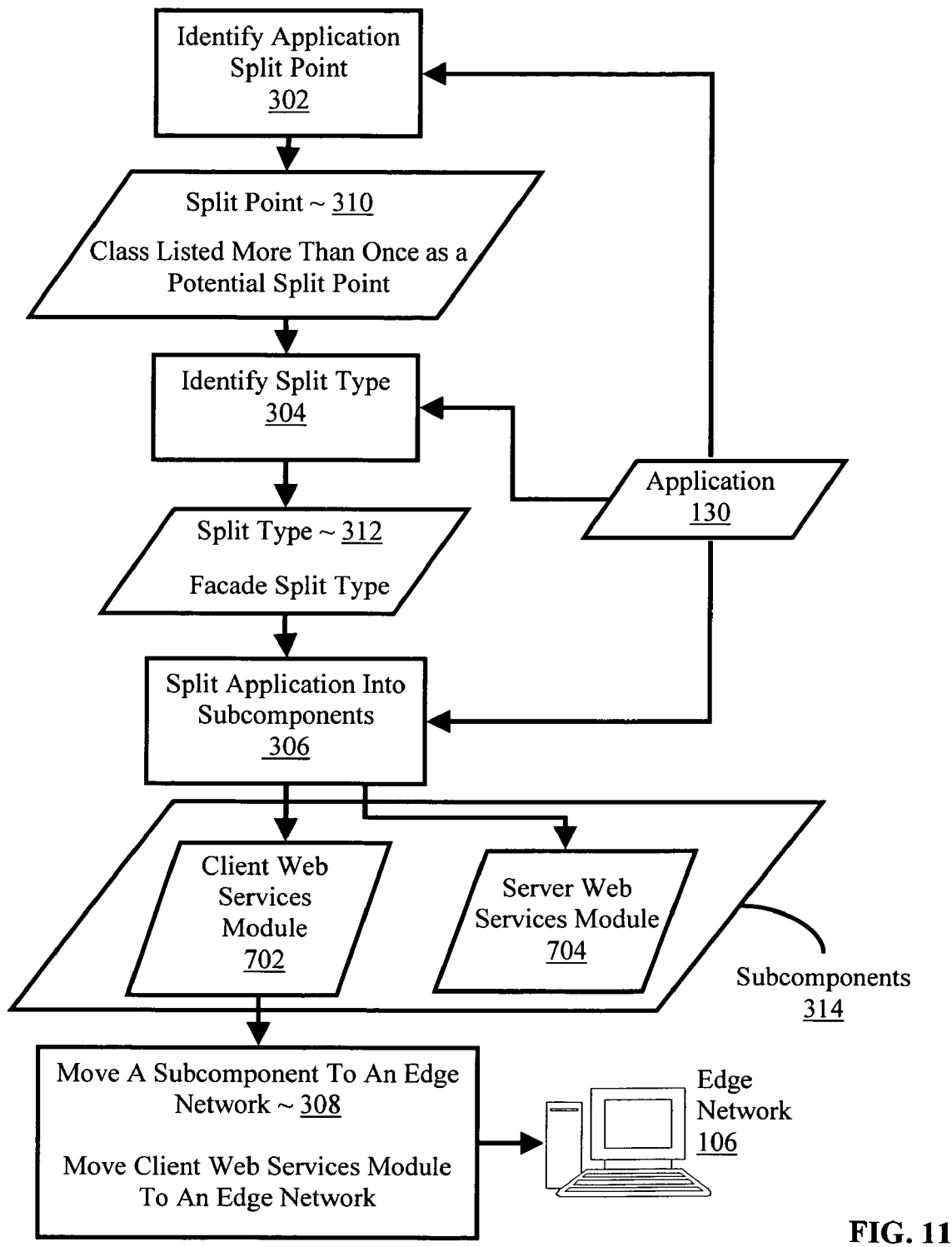
FIG. 11 sets forth a flow chart illustrating an exemplary method for application splitting for network edge for the façade split type.

For further explanation, FIG. 11 sets forth a flow chart illustrating an exemplary method for application splitting for network edge for the façade split type. In the example of FIG. 11, the application split point (310) is identified as a class in a calling hierarchy that is listed more than once as a potential split point, and the split type (312) is identified as a façade split type. In the method of FIG. 11, splitting (306) the application (130) into subcomponents (314) in accordance with the split type (312) is carried out by splitting the classes in the calling hierarchy into a client web services module (702) and a server web services module (704). In the method of FIG. 11, moving (308) a subcomponent to an edge network (106) is carried out by moving the client web services module (702) to the edge network (106).

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for application splitting for network edge computing, the method comprising:
    identifying an application split point;
    identifying a split type for the application split point including identifying a silo split type, an EJB split type, and facade split type for the application split point;
    splitting the application into subcomponents in accordance with the split type, including:
        checking that each class to be included in a subcomponent is serializable;
        checking for the presence of classes that maintain stateful data which may usefully be maintained in more than one subcomponent; and
        if any classes are present that maintain stateful data which may usefully be maintained in more than one subcomponent, inserting glue classes and calls to glue classes to assure that the stateful data is made available as needed; and
    moving a subcomponent to an edge network.

2. The method of claim 1 wherein identifying an application split point further comprises identifying a class of the application that calls an EJB.

3. The method of claim 1 wherein identifying an application split point further comprises identifying a class of the application that updates an enterprise database.

4. The method of claim 1 wherein identifying an application split point further comprises identifying a class of the application that calls a JCA function.

5. The method of claim 1 wherein:
the application split point comprises a class in a calling hierarchy that calls an EJB;
the split type comprises an EJB split type;
splitting the application into subcomponents in accordance with the split type further comprises splitting the classes in the calling hierarchy into a client RMI module and a server RMI module; and
moving a subcomponent to an edge network further comprises moving the client RMI module to the edge network.

6. The method of claim 1 wherein:
the application split point comprises a class in a calling hierarchy that calls an EJB;
the split type comprises an EJB split type;
splitting the application into subcomponents in accordance with the split type further comprises splitting the classes in the calling hierarchy into a client web services module and a server web services module; and
moving a subcomponent to an edge network further comprises moving the client web services module to the edge network.

7. The method of claim 1 wherein:
the application split point comprises a class in a calling hierarchy that updates an enterprise database;
the split type comprises a silo split type;
splitting the application into subcomponents in accordance with the split type further comprises aggregating as one subcomponent all the classes in the calling hierarchy into a silo module: and
moving a subcomponent to an edge network further comprises moving the silo module to the edge network.

8. The method of claim 1 wherein:
the application split point comprises a class in a calling hierarchy that calls an EJB and calls an HTTP function;
the split type comprises a silo split type;
splitting the application into subcomponents in accordance with the split type further comprises aggregating as one subcomponent all the classes in the calling hierarchy into a silo module; and
moving a subcomponent to an edge network further comprises moving the silo module to the edge network.

9. The method of claim 1 wherein:
the application split point comprises a class in a calling hierarchy that calls a JCA function and calls an HTTP function;
the split type comprises a silo split type;
splitting the application into subcomponents in accordance with the split type further comprises aggregating as one subcomponent all the classes in the calling hierarchy into a silo module; and
moving a subcomponent to an edge network further comprises moving the silo module to the edge network.

10. The method of claim 1 wherein:
the application split point comprises a class in a calling hierarchy that is listed more than once as a potential split point;
the split type comprises a facade split type;
splitting the application into subcomponents in accordance with the split type further comprises splitting the classes in the calling hierarchy into a client web services module and a server web services module; and
moving a subcomponent to an edge network further comprises moving the client web services module to the edge network.

11. A system for application splitting for network edge computing, the system comprising a computer processor and a computer memory operatively coupled to the computer processor, the computer memory having disposed within it computer program instructions capable, when executed, of causing the processor to carry out the steps of:
identifying an application split point;
identifying a split type for the application split point including identifying a silo split type, an EJB split type, and a facade split type for the application split point;
splitting the application into subcomponents in accordance with the split type, including:
checking that each class to be included in a subcomponent is serializable;
checking for the presence of classes that maintain stateful data which may usefully be maintained in more than one subcomponent; and
if any classes are present that maintain stateful data which may usefully be maintained in more than one subcomponent, inserting glue classes and calls to glue classes to assure that the stateful data is made available as needed; and
moving a subcomponent to an edge network.

12. The system of claim 11 wherein identifying an application split point further comprises identifying a class of the application that calls an EJB.

13. The system of claim 11 wherein identifying an application split point further comprises identifying a class of the application that updates an enterprise database.

14. The system of claim 11 wherein identifying an application split point further comprises identifying a class of the application that calls a JCA function.

15. The system of claim 11 wherein:
the application split point comprises a class in a calling hierarchy that calls an EJB;
the split type comprises an EJB split type;
splitting the application into subcomponents in accordance with the split type further comprises splitting the classes in the calling hierarchy into a client RMI module and a server RMI module; and
moving a subcomponent to an edge network further comprises moving the client RMI module to the edge network.

16. A computer program product for application splitting for network edge computing, the computer program product disposed upon a computer-readable recording medium, the computer program product comprising computer program instructions capable, when executed, of causing automated computing machinery to carry out the steps of:
identifying an application split point;
identifying a split type for the application split point including identifying a silo split type, an EJB split type, and a facade split type for the application split point;
splitting the application into subcomponents in accordance with the split type, including:
checking that each class to be included in a subcomponent is serializable;
checking for the presence of classes that maintain stateful data which may usefully be maintained in more than one subcomponent; and
if any classes are present that maintain stateful data which may usefully be maintained in more than one subcomponent, inserting glue classes and calls to glue classes to assure that the stateful data is made available as needed; and for moving a subcomponent to an edge network.

17. The computer program product of claim 16 wherein:

the application split point comprises a class in a calling hierarchy that calls an EJB;

the split type comprises an EJB split type;

splitting the application into subcomponents in accordance with the split type further comprises splitting the classes in the calling hierarchy into a client RMI module and a server RMI module; and moving a subcomponent to an edge network further comprises moving the client RMI module to the edge network.

18. The computer program product of claim 16 wherein:

the application split point comprises a class in a calling hierarchy that calls an EJB;

the split type comprises an EJB split type;

splitting the application into subcomponents in accordance with the split type further comprises splitting the classes in the calling hierarchy into a client web services module and a server web services module; and moving a subcomponent to an edge network further comprises moving the client web services module to the edge network.

19. The computer program product of claim 16 wherein:

the application split point comprises a class in a calling hierarchy that updates an enterprise database;

the split type comprises a silo split type;

splitting the application into subcomponents in accordance with the split type further comprises aggregating as one subcomponent all the classes in the calling hierarchy into a silo module; and moving a subcomponent to an edge network further comprises moving the silo module to the edge network.

20. The computer program product of claim 16 wherein:

the application split point comprises a class in a calling hierarchy that calls an EJB and calls an HTTP function;

the split type comprises a silo split type;

splitting the application into subcomponents in accordance with the split type further comprises aggregating as one subcomponent all the classes in the calling hierarchy into a silo module; and moving a subcomponent to an edge network further comprises moving the silo module to the edge network.

21. The computer program product of claim 16 wherein;

the application split point comprises a class in a calling hierarchy that calls a JCA function and calls an HTTP function;

the split type comprises a silo split type;

splitting the application into subcomponents in accordance with the split type further comprises aggregating as one subcomponent all the classes in the calling hierarchy into a silo module; and moving a subcomponent to an edge network further comprises moving the silo module to the edge network.

22. The computer program product of claim 16 wherein:

the application split point comprises a class in a calling hierarchy that is listed more than once as a potential split point;

the split type comprises a facade split type;

splitting the application into subcomponents in accordance with the split type further comprises splitting the classes in the calling hierarchy into a client web services module and a server web services module; and moving a subcomponent to an edge network further comprises moving the client web services module to the edge network.

\* \* \* \* \*

UNITED STATES PATENT AND TRADEMARK OFFICE
CERTIFICATE OF CORRECTION

PATENT NO. : 7,634,755 B2 Page 1 of 1
APPLICATION NO. : 10/889777
DATED : December 15, 2009
INVENTOR(S) : Alexandre Polozoff It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1133 days.

Signed and Sealed this

Ninth Day of November, 2010

David J. Kappos
*Director of the United States Patent and Trademark Office*